(12) United States Patent
Grow et al.

(10) Patent No.: US 7,370,117 B2
(45) Date of Patent: May 6, 2008

(54) COMMUNICATION SYSTEM AND METHOD FOR COMMUNICATING FRAMES OF MANAGEMENT INFORMATION IN A MULTI-STATION NETWORK

(75) Inventors: Robert M. Grow, Poway, CA (US);
Ronald S. Perloff, Poway, CA (US);
John S. Bell, Escondido, CA (US)

(73) Assignee: Intel Corporation, Santa Clara, CA (US)

( * ) Notice: Subject to any disclaimer, the term of this patent is extended or adjusted under 35 U.S.C. 154(b) by 1133 days.

(21) Appl. No.: 10/255,906

(22) Filed: Sep. 26, 2002

(65) Prior Publication Data

US 2004/0062258 A1    Apr. 1, 2004

(51) Int. Cl.
*G06F 15/16* (2006.01)
(52) U.S. Cl. ........................ 709/236; 709/232; 370/412
(58) Field of Classification Search ................ 709/236, 709/232; 370/412
See application file for complete search history.

(56) References Cited

U.S. PATENT DOCUMENTS 6,463,478 B1 * 10/2002 Lau et al. ................... 709/236

2002/0176430 A1 * 11/2002 Sangha et al. .............. 370/412

* cited by examiner

*Primary Examiner*—Jason Cardone
*Assistant Examiner*—Adnan M. Mirza
(74) *Attorney, Agent, or Firm*—Pillsbury Winthrop Shaw Pittman LLP (57) ABSTRACT

A method of communicating frames of management information includes loading a frame of management information from one of a plurality of stations into a respective one of a plurality of buffers. Whether the frame contains more than a predetermined number of bytes is determined. If an end of the frame is loaded into the respective one of the buffers, then a frame presence flag associated with said one of the plurality of stations is set. A request signal is transmitted to a station management module if the frame contains more than the predetermined number of bytes or if the buffer already contains management information associated with a previously loaded frame. The plurality of stations is polled to determine whether respective frame presence flags have been set. A buffer reading process is performed in a manner dependent upon whether the buffer reading process was triggered by one of the frame presence flags or by the request signal, to provide the station management module with the management information in the frame.

23 Claims, 3 Drawing Sheets

COMMUNICATION SYSTEM AND METHOD FOR COMMUNICATING FRAMES OF MANAGEMENT INFORMATION IN A MULTI-STATION NETWORK

BACKGROUND

1. Technical Field

The present invention generally relates to the field of data communication networks. More particularly, the present invention relates to a novel system and method for communicating frames of management information in a multi-station network.

2. Discussion of Related Art

It is generally known that interfaces (e.g., switches, concentrators, and the like) may be used in a communication network, such as a local area network (LAN), a wide area network (WAN), or the like, to link client devices (e.g., desk-top computers) to one another and/or to a network server. Some of these interfaces also may be used to link client devices to other networks. The typical interface has multiple ports. Each port may be connected to a network interface card (NIC) of a respective client device. Inside the interface, each port typically has a respective interface module that controls the transmission of signals or information between a respective one of the client devices and other interface modules in the interface.

Such interface modules usually operate according to a well-know standard or protocol, an example of which is the fiber distributed data interface (FDDI) standard for token-ring communications. In the typical FDDI-based interface, each port is provided with a respective media access control (MAC) interface module. The functions carried out by the FDDI-based interface and its various MAC interface modules are typically managed pursuant to a well-known station management (SMT) protocol. As part of this SMT protocol, frames of management information are transmitted among an SMT module and the various interface modules.

Each MAC interface module typically is provided with its own processor and its own buffer. This arrangement, however, tends to be expensive. The cost of each processor may contribute significantly to the overall price of the interface. In addition, the size of the interface tends to increase with each additional processor. If the interface is provided in the form of one or more integrated circuit (IC) chips, the use of so many processors can make it difficult or impractical to provide the interface in a sufficiently compact chip or combination of chips.

While some interfaces have been developed so as to include a processor that is shared by multiple interface modules, the resulting interfaces typically include large buffers. This feature, in turn, makes the overall interface incompatible with, or otherwise impractical to implement using, some low-volume chip technologies.

While it has been known to provide 4 or 8 MAC interface modules on a single application specific integrated circuit (ASIC), the cost of the processors used by each such interface module typically makes the resulting interface too expensive. Other difficulties are presented by the size of each interface module's buffer.

There is consequently a need in the art for a more practical and economical method and system for communicating frames of management information. This need extends to a system and method that is compatible with ASIC chip technology.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION

The following detailed description of the present invention refers to the accompanying drawings that illustrate preferred embodiments consistent with this invention. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that the present invention as described below may be implemented in many different embodiments of software, firmware, and hardware in the entities illustrated in the figures. The actual software code or specialized control hardware used to implement the present invention is not limiting of the present invention. Thus, the operation and behavior of the present invention will be described without specific reference to the actual software code or specialized hardware components, it being understood that a person of ordinary skill in the art would be able to design software and/or control hardware to implement the embodiments of the present invention based on the description herein.

Figure 1:
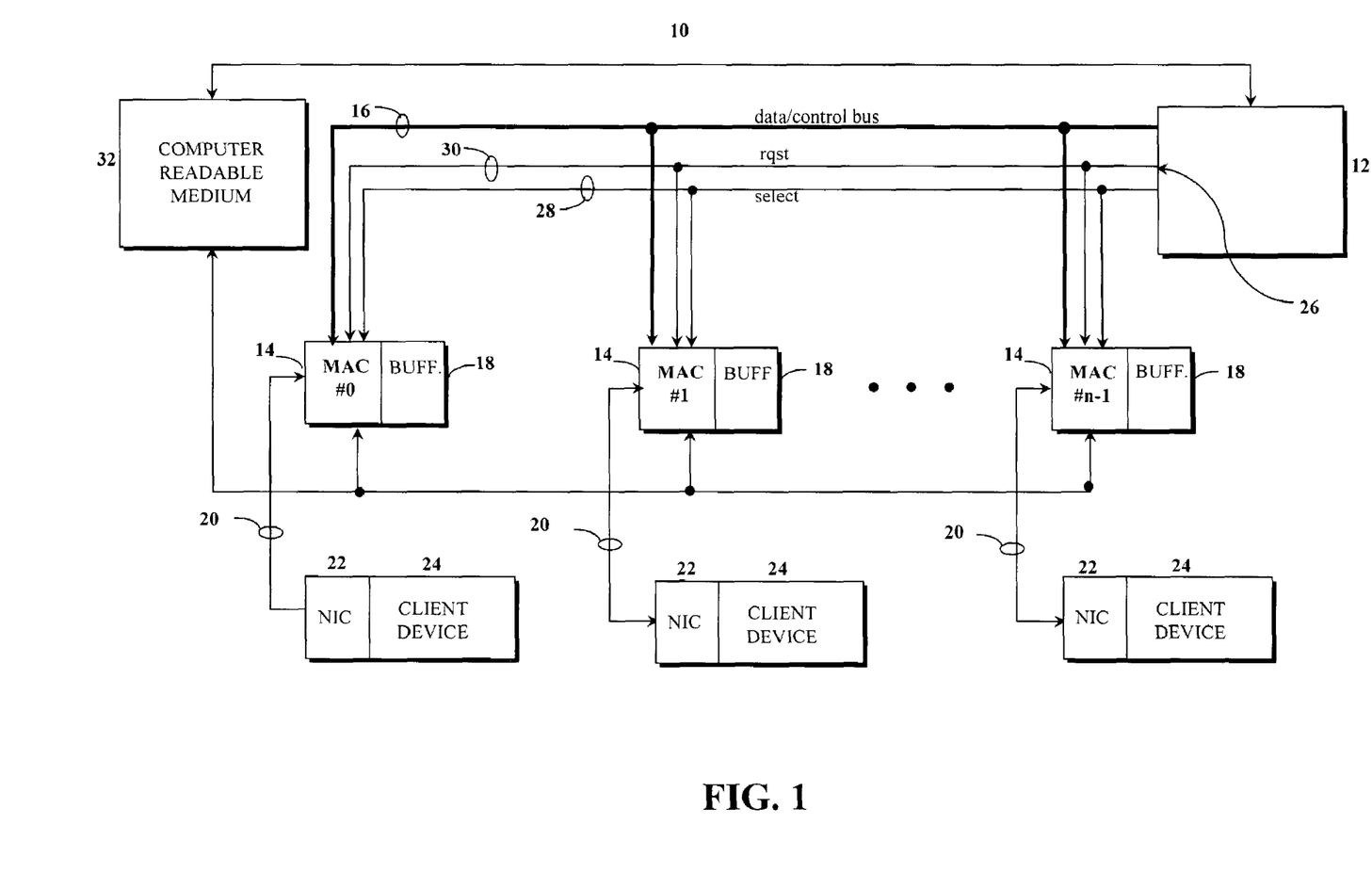
FIG. 1 is a block diagram depicting a communication system according to a preferred implementation of the present invention.

As illustrated in FIG. 1, a preferred embodiment of the present invention provides a communication system 10 for frames of network management information. The communication system 10 includes a station management module 12 and a plurality of station modules 14. The system 10 preferably is implemented in the context of a fiber distributed data interface (FDDI) network (e.g., XFDDI or the like). The station management module 12, in this regard, may be implemented using well-known Station Management (SMT) protocols, and each of the station modules 14 may be implemented using well-known media access control (MAC) protocols.

In the exemplary FDDI implementation, each station module 14 (or MAC module) is provided with a respective client port 20. Each client port 20 may be linked to a respective client device 22 (e.g., a computer device, printer device, or other device that is to be granted access to or be controlled by the FDDI network) or to another FDDI network. This link may be provided in any suitable manner using, for example, an optical fiber line, conductor cabling, or the like. Each client device 22 may be provided with a network interface card (NIC) 24 that serves as an interface to its assigned station module 14.

While the exemplary FDDI implementation is preferred, it is understood that the present invention may be used in other network contexts. It is desirable to utilize the invention in networks that use a small portion of the overall bandwidth for network management messages and wherein most of the management messages are small in size and tend to be bursty in nature.

All of the station modules 14 are connected via at least one bus 16 to the station management module 12. Each of the station modules 14 is associated with a respective buffer 18. In the exemplary implementation of FIG. 1, the station management module 12 has a single SMT receive port 26 that provides support for communications with all of the station modules 14 (e.g., all of the MAC modules). Preferably, this SMT receive port 26 is connected to the bus(es) 16, as well as to a dedicated SELECT link 28 and a dedicated REQUEST link 30.

Each SELECT link 28 provides a communication link from the SMT receive port 26 to a respective one of the station modules 14 (e.g., each of the MAC modules). Each REQUEST link 30, by contrast, provides a communication link in the reverse direction, namely, from a respective one of the station modules 14 to the station management module 12. The bus 16 preferably is a shared DATA/CONTROL bus.

In order to implement the communication system 10, a computer-readable medium 32 may be encoded with a plurality of processor-executable instruction sequences. These instruction sequences, when executed, may cause the various frames of management information to be communicated to and from the station management module 12 in a predetermined manner. This arrangement, in turn, provides a channel for the management information in the network.

For illustrative purposes, the computer-readable medium is shown in FIG. 1 as a single block. The computer-readable medium, however, may be provided as a part of, or alternatively separate from, the station management module 12 and/or the station modules 14. Likewise, parts of the computer-readable medium 32 may be distributed among relevant ones of the station modules 14 and the station management module 12 so that each of the modules 12,14 is able to make its respective contribution to the processor-executable instruction sequence.

Preferably, the computer-readable medium 32 is encoded in such a way that the processor-executable instruction sequences include:

loading of a frame of management information from one of the plurality of station modules 14 into a respective one of the buffers 18, determining whether the loaded frame contains more than a predetermined number of bytes, if an end of the frame is loaded into the respective one of the buffers 18, setting a frame presence flag associated with that particular station module 14, transmitting a request signal to the station management module if the frame contains more than a predetermined number of bytes (hereinafter referred to as a "long" frame) or if the buffer already contains management information associated with a previously loaded frame, polling the plurality of station modules 14 to determine whether respective frame presence flags have been set, and performing a buffer reading process in a manner dependent upon whether the buffer reading process was triggered by one of the frame presence flags or by the request signal, to provide the station management module 12 with the management information in the frame.

The computer-readable medium 32 preferably is encoded to provide interruptible buffer reading processes. The buffer reading processes are made interruptible if they are deemed to be low-priority buffer reading processes. If, for example, a current buffer reading process has been triggered by the presence of one of the frame presence flags (as opposed to a request signal), then it may be assumed that this buffer reading process is of relatively low priority. The fact that the buffer reading process was not triggered by a request signal indicates that the buffer is not being loaded with a second frame of management information and also that it has not been loaded with a long frame (i.e., a frame that has more than the predetermined number of bytes of management information). Thus, the risk that interruption of this buffer reading process will cause the buffer to overflow is insubstantial.

Interruptions of the low-priority buffer reading process (es) may be triggered by the request signal. The presence of any request signal indicates that there is a more urgent need to read information from a respective buffer. The request signal, as indicated above, is asserted when a long frame (containing more than the predetermined number of bytes) is being loaded or is contained in the particular buffer, or when the buffer begins to receive management information associated with a relevant frame while that buffer already contains management information associated with a previously loaded frame. By allowing the lower-priority buffer reading process to be interrupted so that the more urgent buffer reading processes (e.g., those that are triggered by a request signal) may be performed, the present invention provides a significant reduction in the risk of buffer overflow, especially when each buffer is provided with a relatively modest storage capacity (i.e., relatively few bytes of storage capacity). This advantageously facilitates the use of buffers with smaller capacity.

The processor-executable instruction sequences may include at least one instruction sequence for interrupting a low-priority buffer reading process that had been previously triggered by one of the frame presence flags. This interruption preferably is triggered by the request signal from any one of the station modules 14. Upon interruption of the low-priority buffer reading process, a higher-priority buffer reading process may be commenced on the buffer of the station module 14 that is associated with the request signal RQST.

In addition, the higher-priority buffer reading process may be performed in a manner dependent upon whether the frame presence flag is set for the station asserting the request signal. If set, the frame presence flag can indicate that the request signal was generated as a result of a second frame being loaded into the buffer of the particular station module 14 that is asserting the request signal, while another, previously loaded frame remains unread in that buffer. By contrast, when the frame presence flag is not set, this condition can indicate that the buffer of the particular station module 14 that is asserting the request signal contains a frame with more than the predetermined number of bytes of management information. The higher-priority buffer reading processes may be performed differently depending on which of these two different conditions triggered the request signal.

In this regard, the processor-executable instruction sequences may include at least one instruction sequence for:

if the frame presence flag for the station module 14 associated with the request signal is not set when the request signal issues, terminating the higher-priority buffer reading process before all contents of the frame are read out from the buffer and resuming the low-priority reading process; and if the frame presence flag for the station module 14 associated with the request signal is set when the request signal issues, continuing the higher-priority buffer reading process until an end of a frame is read.

Preferably, if the higher-priority buffer reading process is terminated before all contents of the frame are read out from the buffer during the priority buffer reading process (i.e., if the frame presence flag was not set when the request signal issued), then upon reading an end of a frame during the resumed low-priority buffer reading process, any previously terminated higher-priority buffer reading process is resumed to read the previously unread buffer contents. This scheme advantageously provides a way of finishing the low-priority buffer reading process after only part of the long frame is read. Thus, the low-priority buffer reading process may be completed without having to wait for an entire long frame (i.e., a frame in excess of the predetermined number of bytes) to be read completely.

Preferably, the processor-executable instruction sequences include at least one sequence for:

after reading an end of a frame during the higher-priority buffer reading process, determining whether the request signal from any one of the station modules is being asserted; and if, upon reading the end of frame during the higher-priority buffer reading process, no request signal is being asserted by any of the station modules 14, resuming the low-priority buffer reading process that had been previously terminated.

In addition, the processor-executable instruction sequences may include at least one sequence for repeating the higher-priority buffer reading process if, upon reading an end of a frame during the higher-priority buffer reading process, a request signal is being asserted by any one of the station modules 14. If the request signal is being asserted by one of the station modules 14 at that time, the higher-priority buffer reading process is repeated on that particular station module 14. The higher-priority buffer reading process thus may be implemented numerous times on the buffers of the same or different ones of the station modules 14.

The processor-executable instruction sequences also may include at least one sequence that responds to reading of the end of a frame during a resumed low-priority buffer reading process in a manner dependent upon whether the low-priority buffer reading process itself was triggered by the end of a frame. If the low-priority buffer reading process was triggered by the end of a frame, the communication system 10 resumes its polling of the station modules 14. If the resumed low-priority buffer reading process was not triggered by the end of a frame, a previously terminated higher-priority buffer reading process may be resumed when the end of a frame is read during the resumed low-priority buffer reading process. This arrangement provides a convenient and practical way for the control system 10 to determine whether there are any previously started reading operations that should be completed before resuming the polling process described above.

Desirably, there are more than four station modules 14, more desirably, there are more than eight such station modules 14, and preferably at least twenty-four of such station modules are provided. The processor-executable instruction sequences, according to the present invention, are adapted to service all such station modules 14 in the communication system 10 (or interface). The bus 16 may be shared by the plurality of station modules 14 and by a single port of the station management module 12.

Preferably, the processor-executable instruction sequences are adapted for implementation in one of a plurality of processor states. A suitable state machine thus may be configured to carry out the processor-executable instruction sequences. The following are exemplary states for such a state machine:

1. POLLING STATE: The polling state may include polling of the plurality of station modules 14 to determine whether any of the respective frame presence flags have been set. This polling may be performed in "round-robin" manner or otherwise.

2. PRIMARY READ STATE: The primary read state may be implemented when a frame presence flag is detected by the station management module 12 during the polling state while none of the plurality of station modules 14 is asserting its respective request signal. The absence of a request signal indicates that the frame presence flag was triggered, not by a long frame, but rather by the end of a "short" frame (i.e., a frame that does not contain more than the predetermined number of bytes of management information). The primary read state includes reading of management information by the station management module 12 from the respective buffer (i.e., the buffer pertaining to the station module 14 that asserted its request signal). The primary read state terminates by switching to the polling state whenever, during the primary read state, an end of a frame is detected in the absence of the same or another request signal.

3. PRIMARY DETERMINATION STATE: The primary determination state may be implemented when the station management module 12 receives any request signal during the primary read state. The primary determination state includes a determination of whether the frame presence flag is set for the station module 14 providing the request signal.

4. SECONDARY READ STATE: The secondary read state may be implemented when, as a result of the primary determination state, it is determined that the frame presence flag is set for the station module 14 providing the request signal. This scheme indicates that the station module 14 that asserted the request signal is starting to receive a second frame while a first frame is already present in its buffer. The secondary read state includes reading of the management information from the buffer pertaining to the station module 14 that is associated with the request signal. Such reading continues until an end of a frame is read, at which time the secondary read state terminates. This termination is performed by switching into the primary read state if no request signal is present when the end of a frame is read, or if a request signal is again present, by switching into the primary determination state.

5. TERTIARY READ STATE: The tertiary read state may be implemented when, as a result of the primary determination state, it is determined that the frame presence flag is not set for the station module 14 that is associated with the request signal. This scheme indicates that a long frame is being loaded, or has been loaded, into the buffer of that particular station module 14. The tertiary read state includes reading of the management information from the buffer pertaining to the station module 14 that asserted the request signal until it is determined, prior to reading the end of a frame, that a predetermined portion (e.g., about one half) of the management information has been read from the buffer, at which time the tertiary read state terminates.

6. PRIMARY READ FINISHING STATE: The primary read finishing state may be implemented when the tertiary read state terminates. The primary read finishing state includes reading of the buffer that was being read when the most recent request signal was generated. The primary read finishing state terminates when an end of a frame is read.

7. SECONDARY DETERMINATION STATE: The secondary determination state may be implemented when the station management module 12 receives any request signal during the polling state. The secondary determination state includes a determination of whether the frame presence flag is set for the station module 14 that is asserting the request signal.

8. SECONDARY READ FINISHING STATE: The secondary read finishing state may be implemented when the primary read finishing state terminates in response to an end of a frame and also may be implemented when the secondary determination state results in a determination that the frame presence flag is not set for the station module 14 associated with the request signal that triggered the secondary determination state. The process that occurs in the secondary read finishing state preferably depends upon what triggered the secondary read finishing state. If the secondary read finishing state was commenced upon termination of the primary read finishing state, then the secondary read finishing state includes reading of the buffer that was being read immediately prior to switching from the tertiary read state to the primary read finishing state. If, by contrast, the secondary read finishing state was commenced upon termination of the secondary determination state, the secondary read finishing state includes reading of the buffer associated with the station module 14 that provided the request signal that triggered the secondary determination state.

9. TERTIARY DETERMINATION STATE: The tertiary determination state may be implemented in response to any request signal that issues during the secondary read finishing state while unread contents of the buffer being read in the secondary read finishing state amount to less than a predetermined fraction of buffer capacity (e.g., about ½ of buffer capacity). The tertiary determination state includes determining whether the frame presence flag has been set for the station module 14 associated with the request signal that triggered the tertiary determination state. The tertiary determination state terminates in a manner dependent upon the result of this determination. If the result indicates that no frame presence flag has been set for the particular station module 14 that triggered the tertiary determination state, then it can be concluded that a long frame is being loaded into the buffer of that station module 14, and the tertiary determination state terminates by switching to the secondary read finishing state to complete reading of the contents of the buffer that was being read when the tertiary determination state was triggered. The long frame that triggered the tertiary determination state thereby is aborted and remains unread. If, by contrast, it is determined that the frame presence flag has been set for the particular station module 14 that asserted the request signal, then the tertiary determination state terminates by switching to the primary read finishing state to read contents of the buffer pertaining to that station module 14.

10. DOUBLE FRAME READING STATE: The double frame reading state may be implemented if, during the secondary determination state, it is determined that the frame presence flag is set for the station module associated with the request signal that triggered the secondary determination state. This setting indicates that a second frame is being loaded into a buffer that already contains a previously loaded frame. The double frame reading state includes reading of the buffer pertaining to the station module 14 that is associated with the request signal until an end of a frame is read, at which time, the double frame reading state switches to one of two states, namely, the polling state or the secondary determination state. The double frame reading state terminates in a switch to the polling state if no request signal is being asserted when the end of a frame is read during the double frame reading state. If, by contrast, a request signal is being asserted when the end of a frame is read, then the double frame reading state terminates by switching to the secondary determination state.

Preferably, the processor-executable instruction sequences include terminating the secondary read finishing state by switching to the polling state when, in the absence of any request signal, the end of a frame is read during the secondary read finishing state, and by switching to the secondary determination state when the end of a frame is read during the secondary finishing state while a request signal is present.

With respect to the aforementioned exemplary states, the predetermined portion and the predetermined fraction preferably are substantially equal. The predetermined portion and predetermined fraction preferably are about ½ of buffer capacity.

In the typical FDDI-based network, most of the frames of management information contain no more than 74 bytes of such information. If it is assumed that the station management module 12 is able to read management information out from each buffer 18 at a rate that is about twice as fast as the rate at which each station module 14 loads the management information into its respective buffer 18, then the aforementioned arrangement allows each of the buffers 18 to be provided with a capacity as small as about 96 bytes without significantly affecting the rate of dropped frames.

Exemplary clock speeds are 25 MHz for the reading of the information stored in each buffer 18 and about 12.5 MHz for the loading of each buffer 18 by the station module 14 (or MAC). Each buffer 18 preferably is provided in a FIFO (first-in, first-out) configuration.

Preferably, the communication system 10 is implemented in a single ASIC (application-specific integrated circuit) chip. The present invention advantageously facilitates the implementation of such a communication system 10 in a more compact manner. It also allows the communication system 10 to be implemented without having to provide each station module 14 (or MAC) with its own processor. By providing the signaling and control in the manner described above, it is advantageously more practical to provide each station with a smaller buffer capacity, and to do so with no substantial increase in the occurrence of dropped frames.

An exemplary implementation of the foregoing arrangement will now be described, again with reference to FIG. 1. The exemplary implementation provides a reception interface between an XFDDI MAC module 14 and an SMT module 12. A single logical port of the SMT module 12 provides all the bandwidth required to support at least 24 MAC modules 14. The port consists of the shared DATA/CONTROL bus 16 plus individual SELECT and RQST lines 28,30 respectively to and from each of the MAC modules 14. The data path preferably is eight bits wide and runs at about 25 MHz. This configuration provides a gross bandwidth of about 200 Mbps. Each MAC module 14 has a 96 byte-deep receive FIFO buffer 18.

Since station management (SMT) traffic normally presents a very small load to an FDDI station (well under one percent of the available bandwidth), a single processor with a reasonable amount of supporting hardware may be adapted, according to the exemplary implementation, to simultaneously support the station management process for all twenty-four of the MAC modules 14. This scheme represents a significant and advantageous departure from prior art arrangements, some of which require a processor for each MAC machine.

The exemplary implementation provides all of this while also advantageously handling the peaks in station management (SMT) traffic in a manner that minimizes dropped packets. In the exemplary XFDDI context, virtually all but the very infrequent large echo frames are 74 bytes or less in length. Since the exemplary implementation is adapted to reliably handle the occasional large echo frame and back-to-back neighbor information frames (NIFs), it operates very effectively despite its advantageously small requirements in buffer size and its advantageous lack of dependence upon multiple processors.

The MAC modules 14 of the exemplary implementation are adapted to operate in a forward mode, second frame mode, or a long frame mode, depending on the traffic of management information frames.

Forward Mode

Each MAC module 14 operates in the forward mode when its respective FIFO buffer 18 contains no unread, previously loaded frames and it begins to receive a frame for the SMT port 26 of the SMT module 12. The MAC module 14 starts loading the FIFO buffer 18 with the frame of management information. If it reaches the end of the frame before 80 bytes are loaded (a predetermined number of bytes, as described above), it stops loading the FIFO buffer 18, it sets a FRAME line (an example of the aforementioned frame presence flag) on its tri-state output to the DATA/CONTROL bus 16 and waits for the SMT module 12 to select it via the select signal (e.g., on the SELECT line 28).

Meanwhile, when the SMT module 12 is idle (i.e., when it is not already receiving frames of management information), it polls the various MAC modules 14 by asserting the SELECT lines 28 in a round-robin fashion looking for an asserted FRAME line. When it finds one, it reads data from its respective buffer 18, preferably one byte at a time at a first clock rate (e.g., 25 MHz) until it finds the "end of a frame" mark. The SMT module 12 then returns to polling of the MAC modules 14 in sequence.

Second Frame Mode

If, however, a MAC module 14 starts receiving a frame of management information when its FIFO buffer 18 is not empty, it immediately asserts its individual request line (RQST) as an urgent request for the SMT module's attention. It also sets a multi-frame indicator line on its tri-state output to the DATA/CONTROL bus 16. If the SMT module 12 is not involved in collecting a frame from another MAC module 14, it goes directly to the requesting MAC module 14 by asserting its select signal, it unloads the first frame, and returns to round robin polling of the MAC modules 14.

If the SMT module 12 had been unloading another MAC module's FIFO buffer 18, it would be doing so as a result of responding to 1) having found that particular MAC module's FRAME line asserted during normal, round robin testing, or 2) an earlier request signal (RQST) from that particular MAC module 14. In the first case, it temporarily abandons that other MAC module 14, unloads the first frame from the urgent-requesting MAC module 14 (the one with the asserted request signal (RQST)), and returns to reading of the MAC module that was previously being read. In the second case, it waits until it has read a predetermined part (e.g., ½) of the FIFO buffer 18 of the first MAC module 14 before abandoning it to read the MAC module 14 that is asserting the new request signal (RQST). Since the SMT module 12 may be adapted to read the FIFO buffer 18 twice as fast as the MAC module 14 can load it, and since the first frame in the urgently requesting MAC module 14 is less than 80 bytes long, the SMT module 12 is able to resume reading of the first MAC module's FIFO buffer 18 before it overflows. The SMT module 12, preferably, will not respond to an asserted request signal (RQST) if it is already involved with two buffer readings that were triggered by respective request signals (RQST).

Long Frame Mode

In long frame mode, a MAC module 14 loads 80 bytes (an example of the aforementioned predetermined number of bytes) of received management information from a single frame into its FIFO buffer 18 without reaching the end of the frame. It therefore asserts its respective request signal (RQST) on its dedicated request line 30. If the SMT port 26 of the SMT module 12 to which that request line 30 is connected is not in the process of collecting a frame of management information from another MAC module 14, it directly selects (via the select signal) the MAC module 14 that is asserting the request signal (RQST) and starts reading the frame of management information from that MAC module's buffer 18. Since the SMT module 12 can read the FIFO buffer 18 at twice the speed at which the MAC module 14 loads it, the SMT module 12 can read the entire contents of FIFO buffer 18 before an end of the frame is reached. Nonetheless, it remains engaged with that MAC module 14 (i.e. reading contents of that MAC module's buffer 18) until either it reaches the end of the frame or another MAC module 14 asserts its request signal (RQST).

If the SMT module 12 had been reading another MAC module's FIFO buffer 18, it would be as a result of responding to 1) having found that MAC module's FRAME line (an example of the aforementioned frame presence flag) asserted during normal, round robin polling of the MAC modules 14, or 2) an earlier request signal (RQST) from that particular MAC module 14. In the first case, the SMT module 12 temporarily abandons that other MAC module 14, reads the FIFO buffer 18 of the urgent-requesting MAC module 14 until half of that FIFO buffer's contents have been read, returns to completely read the frame of management information in the first MAC module 14, and then returns to finish reading the long frame in the urgent-requesting MAC module 14 as though it had commenced that process from idle (i.e., from a polling state).

In the second case, the SMT module 12 waits until it has read half of the contents of the FIFO buffer 18 of the first MAC module 14 before abandoning it to service the MAC module 14 that is asserting the newer request signal (RQST). If the SMT module 12 determines that the request signal (RQST) is the result of a long frame, it returns its attention to the MAC module 14 that asserted the earlier of the request signals (RQST). It preferably declines to read the contents of the buffer 18 that pertains to the MAC module 14 that was last to assert its request signal (RQST) because there is insufficient bus bandwidth to unload two long frames simultaneously. Such abandonment of the information contained in the last MAC module's buffer is a trade off for the advantages of providing a more compact arrangement of buffers and the various other expedients provided by this exemplary implementation.

State Machine

Figure 2:
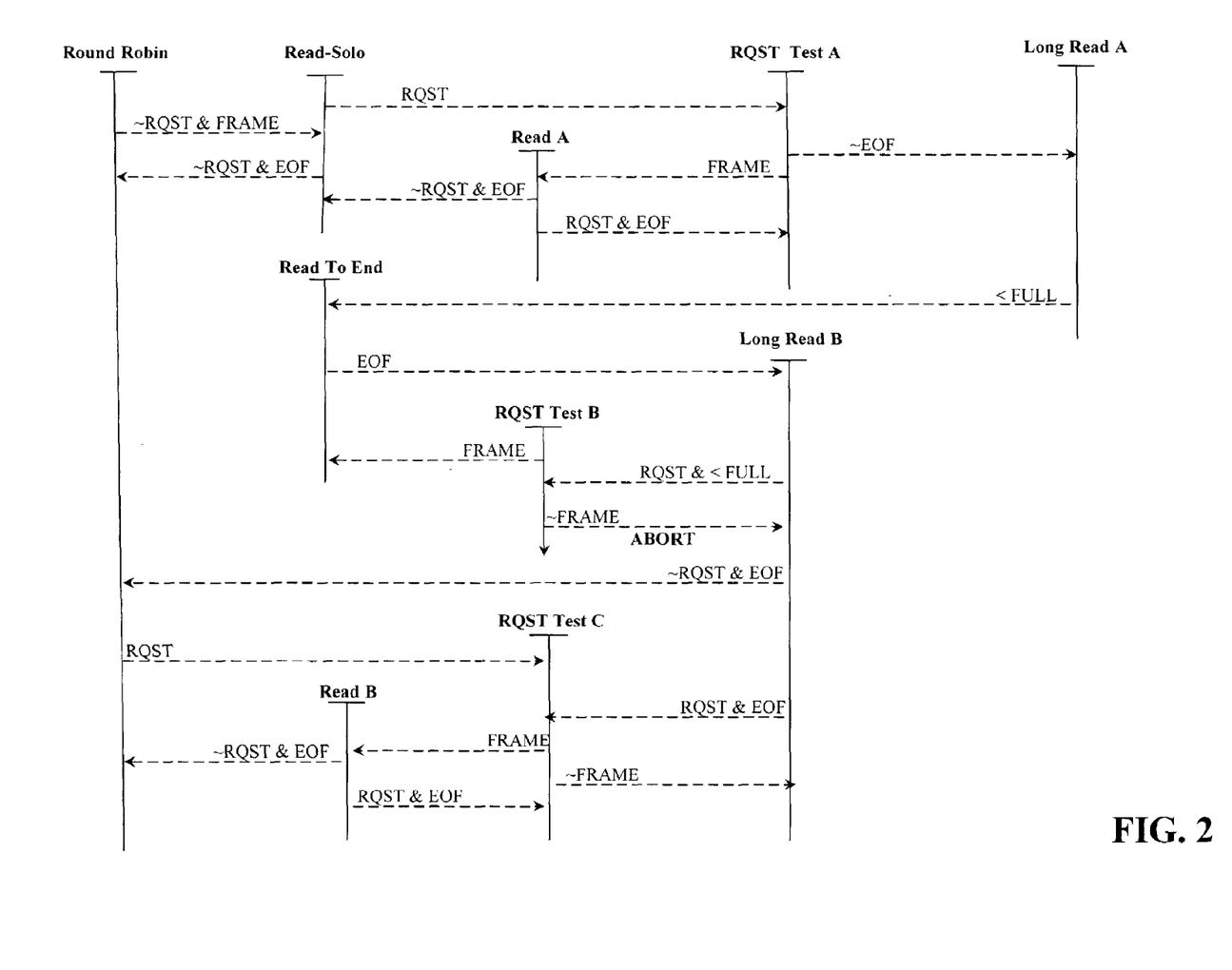
FIG. 2 is a state diagram illustrating a preferred state-machine-based implementation of the present invention.

With reference to the state diagram of FIG. 2, the foregoing exemplary implementation of the communication system 10 may be configured as a state machine. The state machine operates in a Round Robin state during which it polls the various MAC modules 14 until either it receives a RQST signal from a MAC module 14 or it finds that the MAC module 14 it is polling has set its FRAME flag indicating that its FIFO buffer 18 contains a complete frame.

If the MAC module 14 being polled has set its FRAME flag, the state machine enters the Read Solo state. In the Read Solo state, the state machine reads a frame from the MAC module 14 pertaining to the FRAME flag that caused the state machine to exit the Round_Robin state. When assertion of the end of frame (EOF) flag by the MAC module 14 terminates that process, the state machine returns to the Round Robin state. A RQST signal received by the state machine prior to achieving the EOF will interrupt the read process.

In all three RQST_Test states, the SMT module 12 reads the tri-state bus 16 driven by the MAC module 14 asserting the RQST signal. If the FRAME flag is asserted, then the RQST signal is the result of the MAC module 14 starting to receive a second frame while a first frame is complete in its FIFO buffer 18. Otherwise, the RQST signal is the result of the MAC module 14 being in the process of receiving a long frame (e.g., because it has received 80 or more bytes without finding the end of the frame).

In a Long_Read_A state, the SMT module 12 reads from the FIFO buffer 18 of the MAC module 14 that is asserting the RQST signal until the MAC module's FIFO buffer 18 is LESS than half full (i.e., less than half of its contents remain unread). The state machine then switches states, to a Read_To_End state in which it completes reading of the FIFO buffer 18 of the MAC module 14 that it had been servicing in the Read_Solo state, before returning to a Long_Read_B state to finish reading the long frame. The state machine can get to the Long_Read_B state directly from the RQST_Test_C state, as a result of a RQST signal interrupting the Round Robin state activity for a long frame.

In the Long_Read_B state, the SMT module 12 is reading a long frame with no other pending activity. If the FIFO buffer 18 of the MAC module 14 it is servicing is LESS than half full, it can accept a RQST to handle another frame. From the RQST_Test_B state, the state machine either goes to the Read _To_End state to read a complete frame from a MAC module 14 that indicated that a second frame is coming or it aborts a request to read a second long frame and returns to the Long_Read_B state.

In a Read_B state, the state machine is reading a complete frame from the FIFO buffer 18 of a MAC module 14 that has indicated that a second frame is arriving. The state machine remains in that state until it finds the end of the first frame.

Based on expected SMT traffic patterns, it is believed that the exemplary communication system 10 (or interface) will operate very well and drop very few frames. There are, however, windows of opportunity for losing frames. While the communication system 10 may be adapted to mitigate or eliminate the occurrence of dropped frames during the following exemplary windows of opportunity, it is believed that the overall frequency of dropped frames is so small that it typically will not justify changes in design, additional cost, any increases in size, additional hardware, or the like.

System Overload

The first exemplary situation where frames are more likely to be dropped is during a system overload. The maximum bandwidth of each port is 200 Mbps in the exemplary XFDDI implementation. A bus 16 with m MAC modules 14 can conceivably be presented with m times 100 Mbps of traffic. The system 10, in that situation, therefore will have to drop a lot of frames. Notably, however, the system 10 can handle receiving peaks of one normal frame on each MAC module 14 without any problem and can handle at least one of the MAC modules 14 receiving a second frame immediately after its first.

Two Long Frames

Since bus overhead reduces the effective bandwidth of a port to less than 200 Mbps, the bus cannot accommodate two long frames that would require a net of 200 Mbps. This occurrence, however, is believed to be an infrequent enough occurrence that it does not justify providing additional bandwidth to overcome this limitation.

Second Frame Vulnerability

When the SMT module 12 is involved with reading either a long frame or the first frame of two from a MAC module 14, it should not abandon that MAC module 14 to handle another RQST signal until the FIFO buffer 18 it is servicing is reduced to half full or less. This reason is so because of what the second RQST signal represents. If it arose because the other MAC module 14 is receiving a long frame, it does not matter how quickly the SMT module 12 responds to it because the SMT module 12 will refuse to service a second long frame. If it arose because the other MAC module 14 started receiving a second frame, then the SMT module will unload (i.e., read) the complete first frame. Since a 72 byte frame takes 72 clocks plus overhead to unload (or read), the SMT module 12 should not abandon the first MAC module 14 until there is room for at least 36 more bytes in its FIFO buffer 18. Otherwise, the FIFO buffer 18 could overflow.

Thus, there is a window of vulnerability just after the SMT module 12 starts servicing a second frame RQST signal when it does not respond to another second frame RQST signal and the FIFO buffer 18 on that second MAC module 14 will overflow. A third occurrence of a second frame likewise will not be serviced. These scenarios, however, are infrequent enough that the system 10 will perform very well and such that the expense of mitigating or eliminating any resulting dropped frames typically is not justified.

Each MAC module 14 may be provided in the form of an ASIC chip. A preferred implementation of such an ASIC chip includes several interface pins, namely, a RQST_L pin, a SELECT_L pin, eight data pins (DATA 7-0), an EOF_L pin, a VALID_L pin, a FRAME_L pin, an OVERRUN_L pin, an INVALID_L pin, an ABORT_L pin, and a SOF_L pin.

RQST_L

The RQST_L pin is used by the MAC module 14 to transmit the request signal to the SMT module 12. When low, this individual pin from the MAC module 14 requests expedited service when the MAC module 14 is receiving a long frame or when the MAC module 14 has begun receiving a second frame while a previously received frame is already in its FIFO buffer 18. The MAC module 14 de-asserts the RQST_L as soon as the SELECT line to that MAC module 14 is asserted.

SELECT_L

The SELECT_L pin serves as an input for the select signal from the SMT module 12. When driven low by the SMT module 12, the SELECT_L pin indicates that the MAC module 14 has been selected by the SMT module 12. The MAC module 14 responds by driving its tri-state output to the bus 16 in the next clock cycle and continues doing so until the cycle following that in which the SELECT_L line goes low. When low, the SELECT_L line makes certain implications about the SMT module 12 reading and accepting data.

DATA 7-0

The eight data pins (DATA 7-0) are connected to respective data lines of the bus 16. Preferably, the chip is configured so that these data pins (DATA 7-0) and the respective data lines are driven by the MAC module 14 in high true form.

EOF_L

The EOF_L pin provides an output for the end of frame (EOF) indication, flag, or signal. When low, this tri-state output signal can be applied to the bus 16 by the MAC module 14 to indicate to the SMT module 12 that the current byte is the last byte of a frame.

VALID_L

The VALID _L pin may be used to indicate the validity of a current byte of data. When low, this tri-state signal (hereinafter referred to as the VALID signal) from the MAC module 14 indicates that the current byte is valid and that the next three bytes also are valid or that the current byte or one of the three that follow it is the end of a frame.

FRAME_L

The FRAME_L pin may be used by the MAC module 14 as an output for the frame presence flag described above. When low, this tri-state output to the bus 16 from the MAC module 14 indicates that its FIFO buffer 18 contains a complete frame. The MAC module 14 preferably raises this signal after the first cycle during which the SMT module 12 has had an opportunity to read it.

OVERRUN_L

The OVERRUN_L pin may be used by the MAC module 14 as an output for an OVERRUN signal indicative of whether the FIFO buffer 18 associated with that MAC module 14 has overrun. Preferably, when low, this tri-state output signal on the bus 16 indicates that an overflow of the FIFO buffer 18 has occurred. The MAC module 14 lowers this signal the first cycle after the SMT module 12 has had an opportunity to read it.

INVALID_L

The INVALID_L pin may be used by the MAC module 14 as an output for an INVALID signal indicative of whether the frame being read is valid. Preferably, when high, this tri-state signal on the bus 16 indicates that the frame being read is not valid. The MAC module 14 lowers this signal the first cycle after the SMT module 12 has had an opportunity to read it. The invalid frame status may be triggered by the presence of a bad frame format, bad frame check sequence, and the like.

The signal associated with the INVALID_L pin may be combined with the signal associated with the OVERRUN_L pin. Alternatively, in lieu of the INVALID_L pin, the chip may be configured so that both signals associated with the SOF_L and EOF_L pins are asserted in the same cycle. Since there is no valid single byte frame, that unique condition may be interpreted as something else.

ABORT_L

The ABORT_L pin may be used as an input for an ABORT signal from the SMT module 12. When low, this signal from the SMT module 12 indicates that the MAC module 14 which is presently selected (e.g., via its SELECT_L pin) must abort the frame in its FIFO buffer 18. The SMT module 12 may be configured to issue the ABORT signal from the RQST Test B state if it determines that the MAC module 14 issued a RQST signal because the MAC module 14 is already receiving a long frame. There may be other reasons to assert this signal, as one skilled in the art would readily appreciate from this disclosure. Upon or shortly after receiving the ABORT signal, the MAC module 14 removes bytes from its FIFO buffer 18 and continues doing so until it finds a start of a frame. Alternatively, the MAC module 14 may be configured to empty the FIFO buffer 18 with a reset and not put any more data into the FIFO buffer 18 until it receives the start of a new frame.

SOF_L

The SOF_L pin may be used by the MAC module 14 when providing an output signal indicative of whether the accompanying byte is the first byte of a new frame. Preferably, when low, this tri-state signal on the bus 16 indicates that the accompanying byte is the first byte of a new frame. This signal, much like several of the other signals and pins described above, is optional. The SOF_L pin and its associated signal also may be used when implementing the abort process, as indicated above. In addition, the absence of this signal may be used for buffer management when resuming reception of frames.

Timing

Figure 3:
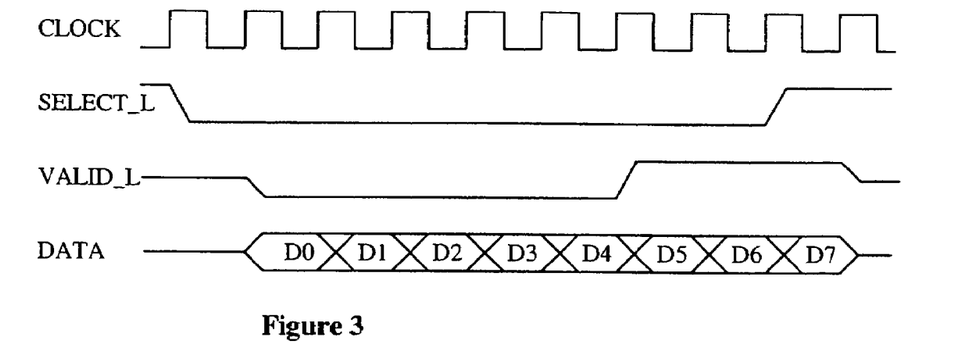
FIG. 3 is a timing diagram illustrating a timing scheme according to a preferred implementation of the present invention.

While the present invention may be implemented using a variety of timing schemes, a preferred timing scheme will be described hereinafter with reference to FIG. 3. The illustrated timing scheme assumes that both the MAC module 14 and the SMT module 12 register all incoming signals before acting upon them and register all outgoing signals just prior to each signal's departure from the chip. Thus, as shown in FIG. 3, when the select signal to a MAC module 14 goes TRUE after the active edge of one clock, the selected MAC module 14 does not take its lines out of tri-state until the next active clock edge. Similarly, if the SMT module 12 lowers the SELECT signal as a result of the VALID signal going low, it takes two active clock edges to do so, one active clock edge being used to register the signal inside the SMT module 12, and the second clock edge being used to display the registered decision it makes.

As indicated above, communication system 10 preferably is configured so that the interface between the SMT module 12 and the MAC module 14 operates based on a 25 MHz clock. Further, the byte clock used by the MAC module's receive state machine is exactly half the speed of and synchronous with the same clock 25 MHz clock. This scheme allows the MAC module 14 to signal across the FIFO buffer 18 with greater precision. The rising edge is the active edge for both the 25 Mhz and 12.5 Mhz clocks. The phase relationship between the clocks is such that the rising edge of the byte clock occurs 5±5 ns after the rising edge of the 25 Mhz clock.

Preferably, the end of a frame is indicated by driving low the EOF_L signal during the same clock period as the final byte of the frame. With respect to word orientation, data preferably is transferred from the MAC module 14 to the SMT module 12 in groups of four bytes at a time, except at the end of a frame. Thus, when the SMT module 12 temporarily abandons a MAC module 14 to service a RQST signal from another MAC module 14, it does so with respect to a multiple of four bytes. Further, even though the VALID signal in FIG. 3 goes low during the byte in which D5 becomes available, the MAC module 14 will make available, and the SMT module 12 will read, bytes D5, D6 and D7. To make this work, the MAC module 14 only asserts the VALID signal when it has four bytes available or the last byte of the frame is one of the next three bytes.

Figure 4:
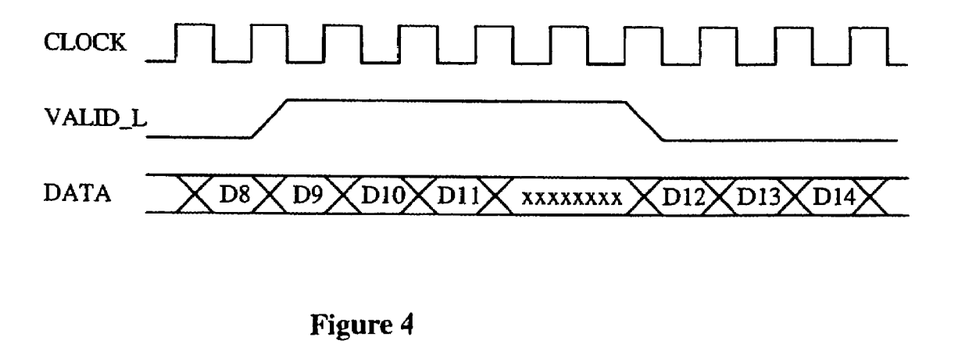
FIG. 4 is another timing diagram illustrating another aspect of a timing scheme according to a preferred implementation of the present invention.

With reference to FIG. 4, the chip preferably is configured to perform a stalling process when unloading (or reading) the FIFO buffer 18. In the exemplary implementation of FIG. 4, the MAC module 14 lowers the VALID line immediately after the first of a group of four bytes it has deemed valid are available by having the VALID line high during the first. When it next raises the VALID line, it indicates that the concurrent byte is valid as will be the next three bytes. This assumes that the SMT module 12 will accept those bytes because the SELECT line (not shown) remained true.

The present invention, as demonstrated above, may be implemented as part of a local area network (LAN) interface, especially any such interface that requires a management channel. Examples of such LAN interfaces include LAN switches and similar multi-port devices, where the media interface implements frame-based management protocols with strict time requirements and predictable basic protocol performance requirements. The present invention also provides an independent management channel separating the SMT frames from the data frames and provides an interrupt and priority structure that advantageously minimizes the probability of frame loss, while also advantageously minimizing the buffering requirements for the management aspects of the interface. This represents a significant advance over the existing interface technology.

Most SMT frames, except the very infrequent, large echo frames, are 74 bytes or less in length. The foregoing exemplary system adequately handles the occasional large echo frame and back-to-back neighbor information frames (NIF). Since SMT traffic normally presents a very small load to an FDDI station, well under one percent of the available bandwidth, a single processor implemented according to the present invention with a reasonable amount of supporting hardware can reliably perform the foregoing instruction sequences for at least 24 stations at once. Even during peaks in demand, the present invention tends to minimize the occurrence of dropped packets.

While the present invention has been described with reference to the foregoing exemplary chip-based embodiment in the context of an XFDDI network, it is understood that the invention may be applied to other networks using the same general configuration as described above, or alternatively, by modifying the foregoing exemplary implementation to include different settings, configurations, hardware, combinations of pins, combinations of signals, and/or the like. Moreover, while the present invention has been described with reference to the SMT protocol, it is understood that embodiments of the present invention may be implemented for any suitable types of management frames in any network or LAN protocol. It is generally desirable to utilize the invention in networks that use a small portion of the overall bandwidth for network management messages and wherein most of the management messages are small in size and tend to be provided in bursts.

The foregoing description of the preferred embodiments provides an illustration and description, but is not intended to be exhaustive or to limit the invention to the precise form disclosed. Modifications and variations are possible consistent with the above teachings or may be acquired from practice of the invention. Thus, it is noted that the scope of the invention is defined by the claims and their equivalents.

What is claimed is:

1. A method of communicating frames of management information, comprising:
    loading a frame of management information from a station of a plurality of stations into a respective buffer of a plurality of buffers;
    determining whether said frame contains more than a predetermined number of bytes;
    if an end of the frame is loaded into the respective buffer of the plurality of buffers, setting a frame presence flag associated with said one of the plurality of stations;
    transmitting a request signal to a station management module if said frame contains more than said predetermined number of bytes or if said respective buffer already contains management information associated with a previously loaded frame;
    polling the plurality of stations to determine whether respective frame presence flags have been set; and
    performing a buffer reading process based on a priority designated according to a status of the frame presence flag, to provide said station management module with the management information in said frame.

2. The method of claim 1, wherein said buffer reading process is interruptible if said buffer reading process is triggered by one of said frame presence flags.

3. The method of claim 1, further including in response to said request signal, interrupting a low-priority buffer reading process triggered by one of said frame presence flags, to perform a higher-priority buffer reading process on the respective buffer of the station associated with the request signal.

4. The method of claim 3, further including if the frame presence flag for the station associated with the request signal is not set when the request signal issues, terminating said higher-priority buffer reading process before all contents of the frame are read out from the respective buffer and resuming the low-priority buffer reading process; and
    if the frame presence flag for the station associated with the request signal is set when the request signal issues, continuing said higher-priority buffer reading process until an end of a frame is read.

5. The method of claim 4, further including upon reading an end of a frame during a resumed low-priority buffer reading process, resuming any previously terminated higher-priority buffer reading process on previously unread buffer contents.

6. The method of claim 4, further including after reading an end of a frame during the higher-priority buffer reading process, determining whether the request signal from any one of the plurality of stations is being asserted; and
    if, upon reading the end of frame during the higher-priority buffer reading process, no request signal is being asserted by any of the plurality of stations, resuming the low-priority buffer reading process that had been previously terminated.

7. The method of claim 6, further including if, upon reading an end of a frame during the higher-priority buffer reading process, a request signal is being asserted by one of the plurality stations, repeating said higher-priority buffer reading process on said one of the plurality of stations.

8. The method of claim 6, further including, in response to reading an end of a frame during a resumed low-priority buffer reading process:
polling the plurality of stations if the resumed low-priority buffer reading process was triggered by an end of a frame; and
if the resumed low-priority buffer reading process was not triggered by an end of a frame, resuming a previously terminated higher-priority buffer reading process.

9. The method of claim 1, wherein said plurality of stations includes more than four stations.

10. The method of claim 9, wherein said method is performed using a single station management module.

11. The method of claim 1, wherein said method is performed using a media access control (MAC) module for each station of the plurality of stations and a station management SMT module that serves all of said media access control (MAC) modules.

12. A computer-readable medium encoded with a plurality of processor-executable instruction sequences which when executed cause:
loading a frame of management information from a station of a plurality of stations into a respective buffer of a plurality of buffers;
determining whether said frame contains more than a predetermined number of bytes;
if an end of the frame is loaded into the respective buffer of the plurality of buffers, setting a frame presence flag associated with said station of the plurality of stations;
transmitting a request signal to a station management module if said frame contains more than a predetermined number of bytes or if said respective buffer already contains management information associated with a previously loaded frame;
polling the plurality of stations to determine whether respective frame presence flags have been set; and
performing a buffer reading process based on a priority designated according to a status of the frame presence flag, to provide said station management module with the management information in said frame.

13. The computer-readable medium of claim 12, wherein the buffer reading process is interruptible if said buffer reading process is triggered by one of said frame presence flags.

14. The computer-readable medium of claim 12, wherein said processor-executable instruction sequences include at least one instruction sequence for, in response to said request signal, interrupting a low-priority buffer reading process triggered by one of said frame presence flags, to perform a higher-priority buffer reading process on the respective buffer of the station associated with the request signal.

15. The computer-readable medium of claim 14, wherein said processor-executable instruction sequences include at least one instruction sequence for:
if the frame presence flag for the station associated with the request signal is not set when the request signal issues, terminating said higher-priority buffer reading process before all contents of the frame are read out from the respective buffer and resuming the low-priority buffer reading process; and
if the frame presence flag for the station associated with the request signal is set when the request signal issues, continuing said higher-priority buffer reading process until an end of a frame is read.

16. The computer-readable medium of claim 15, wherein said processor-executable instruction sequences include at least one sequence for:
upon reading an end of a frame during a resumed low-priority buffer reading process, resuming any previously terminated higher-priority buffer reading process on previously unread buffer contents.

17. The computer-readable medium of claim 12, wherein said processor-executable instruction sequences are adapted to be performed using a media access control (MAC) module for each station of the plurality of stations and a station management SMT module that serves the MAC module for each station of the plurality of stations.

18. A communication system for frames of network management information, comprising:
a station management module; and
a plurality of station modules connected via at least one bus to said station management module, each of said plurality of station modules being associated with a respective buffer,
wherein at least one of said station management module and said plurality of station modules includes a computer-readable medium encoded with a plurality of processor-executable instruction sequences for:
loading a frame of management information from one of the plurality of station modules into the respective buffer;
determining whether said frame contains more than a predetermined number of bytes;
if an end of the frame is loaded into the respective buffer, setting a frame presence flag associated with said one of the plurality of station modules;
transmitting a request signal to the station management module if said frame contains more than a predetermined number of bytes or if said respective buffer already contains management information associated with a previously loaded frame;
polling the plurality of station modules to determine whether respective frame presence flags have been set; and
performing a buffer reading process based on a priority designated according to a status of the frame presence flag, to provide said station management module with the management information in said frame.

19. The communication system of claim 18, wherein said processor-executable instruction sequences include at least one instruction sequence for, in response to said request signal, interrupting a low-priority buffer reading process triggered by one of said frame presence flags, to perform a higher-priority buffer reading process on the respective buffer of the station module associated with the request signal.

20. The communication system of claim 19, wherein said processor-executable instruction sequences include at least one instruction sequence for:
if the frame presence flag for the station module associated with the request signal is not set when the request signal issues, terminating said higher-priority buffer reading process before all contents of the frame are read out from the respective buffer and resuming the low-priority buffer reading process; and
if the frame presence flag for the station module associated with the request signal is set when the request signal issues, continuing said higher-priority buffer reading process until an end of a frame is read.

21. The communication system of claim 20, wherein said processor-executable instruction sequences include at least one sequence for:
upon reading an end of a frame during a resumed low-priority buffer reading process, resuming any previously terminated higher-priority buffer reading process on previously unread buffer contents.

22. The communication system of claim 18, wherein said plurality of station modules includes more than four station modules and wherein said processor-executable instruction sequences are operable to service more than four of said plurality of station modules.

23. The communication system of claim 18, wherein each of said plurality of station modules is a media access control (MAC) module implemented according to a MAC protocol and wherein said station management module is implemented according to a station management (SMT) protocol to serve all of said media access control (MAC) modules.

* * * * *